United States Patent
Shino

(10) Patent No.: US 11,518,043 B2
(45) Date of Patent: Dec. 6, 2022

(54) COMMUNICATION APPARATUS, COMMUNICATION METHOD, ROBOT APPARATUS, PRODUCTION APPARATUS, METHOD OF MANUFACTURING ARTICLE, TRANSMISSION APPARATUS, RECORDING MEDIUM

(71) Applicant: CANON KABUSHIKI KAISHA, Tokyo (JP)

(72) Inventor: Kenji Shino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 16/711,192

(22) Filed: Dec. 11, 2019

(65) Prior Publication Data
US 2020/0198152 A1 Jun. 25, 2020

(30) Foreign Application Priority Data
Dec. 20, 2018 (JP) .............................. JP2018-238830
Oct. 29, 2019 (JP) .............................. JP2019-196805

(51) Int. Cl.
*B25J 13/00* (2006.01)
*H04W 56/00* (2009.01)

(52) U.S. Cl.
CPC ......... *B25J 13/006* (2013.01); *H04W 56/001* (2013.01); *G05B 2219/50391* (2013.01)

(58) Field of Classification Search
CPC .. B25J 13/006; B25J 19/0025; B25J 19/0029; B25J 9/1689; G05B 2219/33203;
(Continued)

(56) References Cited

U.S. PATENT DOCUMENTS

2011/0306374 A1* 12/2011 Hirai .................. G05B 19/4186
455/507
2013/0297069 A1* 11/2013 Tachiwa ............. G05B 19/4185
700/245
(Continued)

FOREIGN PATENT DOCUMENTS

JP 2005-217799 A 8/2005
JP 2005217799 A * 8/2005 ............. G09G 5/006
(Continued)

*Primary Examiner* — Khoi H Tran
*Assistant Examiner* — Tanner L Cullen
(74) *Attorney, Agent, or Firm* — Canon U.S.A., Inc., IP Division

(57) ABSTRACT

A communication apparatus includes a transmission apparatus configured to transmit operation data for an apparatus, a reception apparatus configured to receive the operation data, a wireless communication unit via which the transmission apparatus and the reception apparatus wirelessly communicate with each other, and a cable configured to connect the transmission apparatus and the reception apparatus, wherein the transmission apparatus transmits a synchronization signal to the reception apparatus via the cable, the synchronization signal indicating a timing to execute the operation data, and wherein the transmission apparatus transmits the operation data corresponding to an operation of the apparatus in a predetermined period to the reception apparatus using the wireless communication unit.

23 Claims, 11 Drawing Sheets

(58) Field of Classification Search
CPC ........... G05B 2219/40273; G05B 2219/50391; H04B 1/00; H04B 3/00; H04B 7/00; H04L 7/00; H04W 56/00
See application file for complete search history.

(56) References Cited

U.S. PATENT DOCUMENTS

2017/0127363 A1\* 5/2017 Tamamoto ....... H04B 10/25752
2017/0239822 A1\* 8/2017 Sakata ................... B25J 9/1664

FOREIGN PATENT DOCUMENTS

| JP | 2006321014 A | \* | 11/2006 | .............. B25J 19/00 |
| JP | 2010-283813 A | | 12/2010 | |
| JP | 2013-084111 A | | 5/2013 | |
| JP | 2013084111 A | \* | 5/2013 | .............. B25J 13/00 |
| WO | WO-2020104314 A1 | \* | 5/2020 | ........... G05B 19/409 |

\* cited by examiner

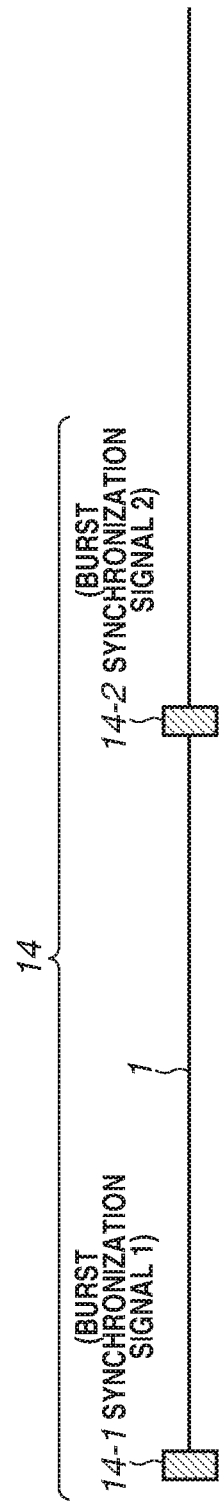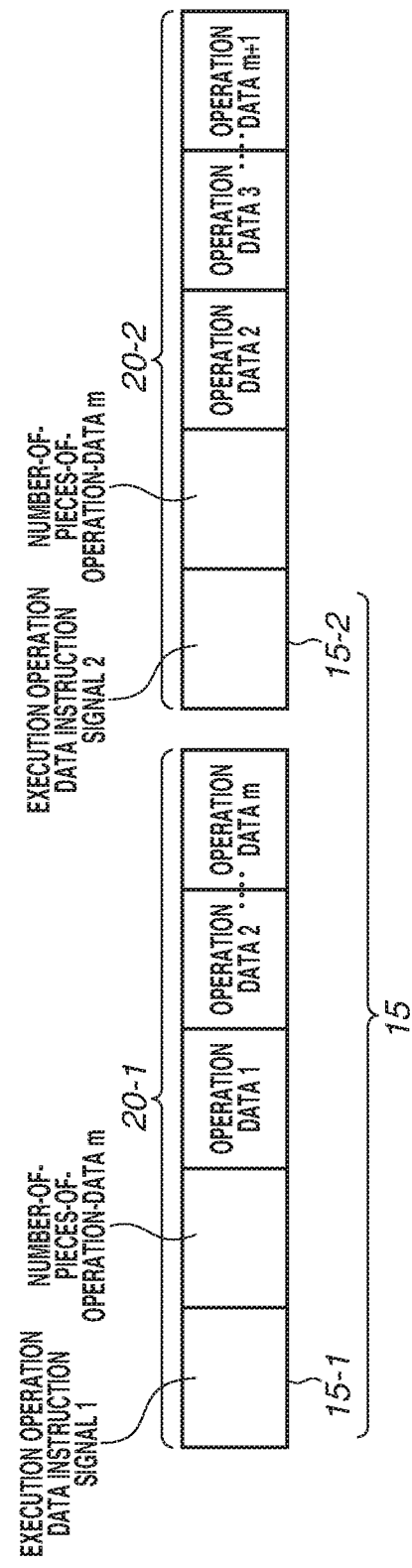

COMMUNICATION APPARATUS, COMMUNICATION METHOD, ROBOT APPARATUS, PRODUCTION APPARATUS, METHOD OF MANUFACTURING ARTICLE, TRANSMISSION APPARATUS, RECORDING MEDIUM

BACKGROUND

Technical Field

The present invention relates to a communication apparatus.

Description of the Related Art

Robot apparatuses equipped with an articulated robot arm have been used as production apparatuses in production lines for manufacturing products. A robot arm of this type operates a workpiece using an end effector attached to a distal end of the robot arm and manufactures articles, such as industrial products and parts. Examples of an end effector include a robot hand as a gripping apparatus and other tools such as an instrument.

A robot hand that functions as an end effector is provided with a finger portion configured to grip a workpiece. The rotation force of a built-in motor of the robot hand is converted to a linear operation by a gear, and the linear operation is transmitted to the finger portion so that the finger portion grips a workpiece.

For example, an alternating-current (AC) servo motor, a stepping motor, or a direct-current (DC) motor is used as a built-in motor of an end effector. Conventional techniques generally use a communication cable extended in a robot arm to transmit a control signal for controlling a built-in motor of an end effector to the motor via the communication cable.

Since a robot arm is being constantly moved, a bending-resistant communication cable is used in a robot arm. Further, since various signals corresponding to the number of finger portions and the number of mounted sensors are transmitted during control of a robot hand, the number of communication cables increases. This raises issues about decrease in bending-resistance of communication cables and increase in thickness of robot arms for enough space for the communication cables. Not only the robot apparatuses but also various production apparatuses have the issues relating to wiring.

In response to the above-described issues, various wireless communication methods in production apparatuses have been discussed for a wireless environment in production apparatuses.

For example, methods that use a protocol that enables high-speed communication, such as Ethernet for Control Automation Technology (EtherCAT), CC-Link Industrial Ethernet (CC-LinkIE), PROFIBUS Decentralized Peripherals (PROFIBUS-DP), or Mechatrolink-III, in addition to conventional Control Area Network (CAN) and Recommended standard (RS)-485 are discussed.

Further, Japanese Patent Application Laid-Open No. 2005-217799 discusses a method in which data that is difficult to transmit by wire, such as high-speed data and data that needs to be multiplexed to be transmitted via a bus line, is wirelessly transmitted whereas data that does not require high-speed, high-volume data transfer is transmitted by wire in order to reduce communication cables in various electronic apparatuses. With the method, the communication cables for transmitting data that needs to be multiplexed can be reduced.

A robot arm can be oriented in various orientations depending on an operation to be executed. Thus, there is a possibility that a blocking object comes between a control apparatus and an end effector and reflects radio waves or the end effector is brought outside a communicable region and the wireless communication is consequently disconnected, which can cause an erroneous operation or loss of real-time properties, depending on the orientation of the robot arm. Disconnection of wireless communication described above can also occur in a production apparatuses that include a movement mechanism configured to move a communication target.

The method discussed in Japanese Patent Application Laid-Open No. 2005-217799 is intended for electronic apparatuses, such as a laptop personal computer (PC), in a situation where wireless communication is stable because a blocking object is not likely to come between a transmission target and a reception target and the transmission target and the reception target are not likely to be brought outside the communicable region. Thus, the method is not applicable for a case where wireless communication may be disconnected when a communication target moves.

SUMMARY

In response to the above-described issues, the present invention is directed to a communication apparatus with which occurrences of an erroneous operation and loss of real-time properties are reduced even in a case where wireless communication is disconnected.

According to an aspect of the present disclosure, a communication apparatus includes a transmission apparatus configured to transmit operation data for an apparatus, a reception apparatus configured to receive the operation data, a wireless communication unit via which the transmission apparatus and the reception apparatus wirelessly communicate with each other, and a cable configured to connect the transmission apparatus and the reception apparatus, wherein the transmission apparatus transmits a synchronization signal to the reception apparatus via the cable, the synchronization signal indicating a timing to execute the operation data, and wherein the transmission apparatus transmits the operation data corresponding to an operation of the apparatus in a predetermined period to the reception apparatus using the wireless communication unit.

Further features of the present disclosure will become apparent from the following description of exemplary embodiments with reference to the attached drawings.

BRIEF DESCRIPTION OF THE DRAWINGS

FIGS. 3A and 3B are schematic views illustrating a synchronization signal that is superimposed on a power supply cable and transmitted and operation data that is transmitted by a wireless signal according to an exemplary embodiment.

DESCRIPTION OF THE EMBODIMENTS

Various exemplary embodiments of the present disclosure will be described below with reference to the attached drawings. It should be noted that each configuration described below is a mere example and a person skilled in the art can change, for example, a detail of the configurations as needed within the spirit of the invention. Further, each numerical value specified in the exemplary embodiments described below is a mere reference numerical value and is not intended to limit the scope of the invention.

Figure 1:
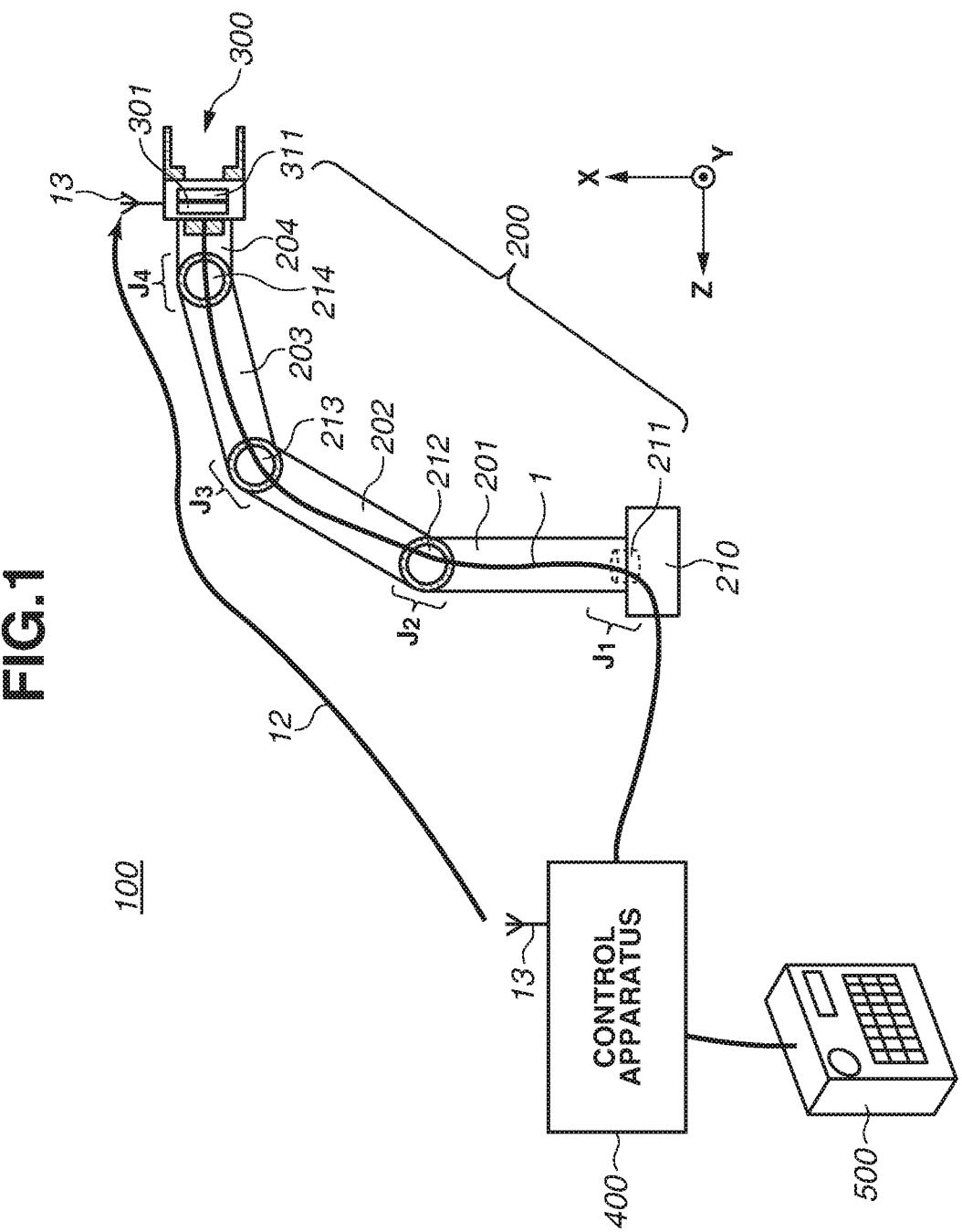
FIG. 1 is a schematic view illustrating a robot apparatus according to an exemplary embodiment.

FIG. 1 is a plan view illustrating a robot apparatus 100 according to a first exemplary embodiment as viewed from a direction in an XYZ-coordinate system. In the drawings specified below, arrows X, Y, and Z indicate a coordinate system of the entire robot apparatus 100. In general, in a robot system that uses a robot apparatus, a local three-dimensional coordinate system with respect to a robot hand or finger portion is used as needed in control in some cases as well as a global XYZ three-dimensional coordinate system of an entire installation environment. In the present exemplary embodiment, the coordinate system of the entire robot apparatus 100 is specified by XYZ and the local coordinate system by xyz.

As illustrated in FIG. 1, the robot apparatus 100 includes an articulated robot-arm main body 200, a robot-hand main body 300, and a control apparatus 400). The control apparatus 400 is a control unit configured to control an operation of the entire robot apparatus 100.

The robot apparatus 100 also includes an external input apparatus 500 which is a teaching apparatus configured to transmit teaching data to the control apparatus 400. An example of the external input apparatus 500 is a teaching pendant which is used by a user to designate positions of the robot-arm main body 200 and the robot-hand main body 300.

While a robot hand is disposed as an end effector at a distal end portion of the robot-arm main body 200 in the present exemplary embodiment, the end effector is not limited to the robot hand and can be a tool.

A link 201, which is a proximal end of the robot-arm main body 200, is disposed on a base plate 210.

The robot-hand main body 300 is configured to grip a target object such as a part or a tool. Two finger portions of the robot-hand main body 300 according to the present exemplary embodiment are opened/closed by a driving mechanism (not illustrated) and a motor 311 to release/grip a workpiece. The robot-hand main body 300 is to grip a workpiece so that the relative position of the workpiece to the robot-arm main body 200 does not change.

Further, the robot-hand main body 300 includes a built-in hand motor driver 301, and the motor driver 301 controls driving of the motor 311.

The robot-hand main body 300 is connected to a link 204, and the link 204 is rotated so that the robot-hand main body 300 is also rotated.

The robot-arm main body 200 includes a plurality of joints, e.g., four joints (four axes). The robot-arm main body 200 includes a plurality of (four) servo motors 211, 212, 213, and 214, which drive and rotate joints $J_1$, $J_2$, $J_3$ and $J_4$, respectively, about rotation axes.

In the robot-arm main body 200, the links 201, 202, 203, and 204, are coupled to each other by the joints $J_1$, $J_2$, $J_3$ and $J_4$, respectively, to be rotatably movable. The links 201 to 204 are serially coupled in this order from the proximal end toward the distal end of the robot-arm main body 200.

In FIG. 1, the base plate 210 and the link 201 of the robot-arm main body 200 are connected with each other by the joint $J_1$, which is rotated about the X-axis.

The links 201 and 202 of the robot-arm main body 200 are connected by the joint $J_2$. The rotation axis of the joint $J_2$ coincides with the Y-axis direction in the state illustrated in FIG. 1.

The links 202 and 203 of the robot-arm main body 200 are connected by the joint $J_3$. The rotation axis of the joint $J_3$ coincides with the Y-axis direction in the state illustrated in FIG. 1.

The links 203 and 204 of the robot-arm main body 200 are connected by the joint $J_4$. The rotation axis of the joint $J_4$ coincides with the Y-axis direction in the state illustrated in FIG. 1.

With the above-described configuration, the robot-arm main body 200 can orient the end effector (the robot-hand main body 300) of the robot-arm main body 200 in desired three directions at a desired three-dimensional position within a movable range.

In the present exemplary embodiment, a hand-end of the robot-arm main body 200 is the robot-hand main body 300. In a case where the robot-hand main body 300 grips an object, the robot-hand main body 300 and the gripped object (e.g., a part, a tool) are collectively referred to as the hand-end of the robot-arm main body 200.

Specifically, the robot-hand main body 300, which is the end effector, is referred to as the hand-end regardless of whether the robot-hand main body 300 is in a state of gripping an object or in a state of not gripping an object.

With the above-described configuration, the robot-arm main body 200 can operate the robot-hand main body 300 to a desired position and cause the robot-hand main body 300 to perform a desired operation. Examples of a desired operation include an operation of gripping a workpiece, attaching the gripped workpiece to a predetermined workpiece, and manufacturing an article.

The robot-hand main body 300 can be, for example, an end effector such as an air-pressure driven air hand.

Further, the robot-hand main body 300 is attachable to the link 204 by a partially-fixing method, such as screwing, or by a removing/replacing method, such as latching.

Especially in a case where the robot-hand main body 300 is removable and replaceable, a method of removing and replacing a plurality of types of the robot-hand main body 300 disposed at a supply position by an operation performed by the robot-arm main body 200 by controlling the robot-arm main body 200 can also be used.

Further, an antenna 13 for wireless communication is disposed in each of the control apparatus 400 and the robot-hand main body 300 to enable transmission and reception of wireless communication between the control apparatus 400 and the built-in hand motor driver 301 of the robot-hand main body 300.

In the present exemplary embodiment, the antenna 13 uses a commonly-used wireless transmission method (e.g., Wi-Fi Institute of Electrical and Electronics Engineers (IEEE) 802.1, fourth generation (4G), fifth generation (5G)).

Operation data for operating the robot-hand main body 300 is transmitted from the control apparatus 400 to the hand motor driver 301 via a wireless communication path 12 of the wireless communication using the antenna 13. The wireless communication is enabled by the antenna 13.

Further, the control apparatus 400 according to the present exemplary embodiment also has a function as a power supply apparatus that supplies power to the robot apparatus 100.

Power to the motor 311 is supplied from the control apparatus 400 via a power supply cable 1.

Further, a synchronization signal containing an execution timing of the operation data for operating the robot-hand main body 300 is also superimposed and transmitted to the hand motor driver 301 via the power supply cable 1.

Figure 2:
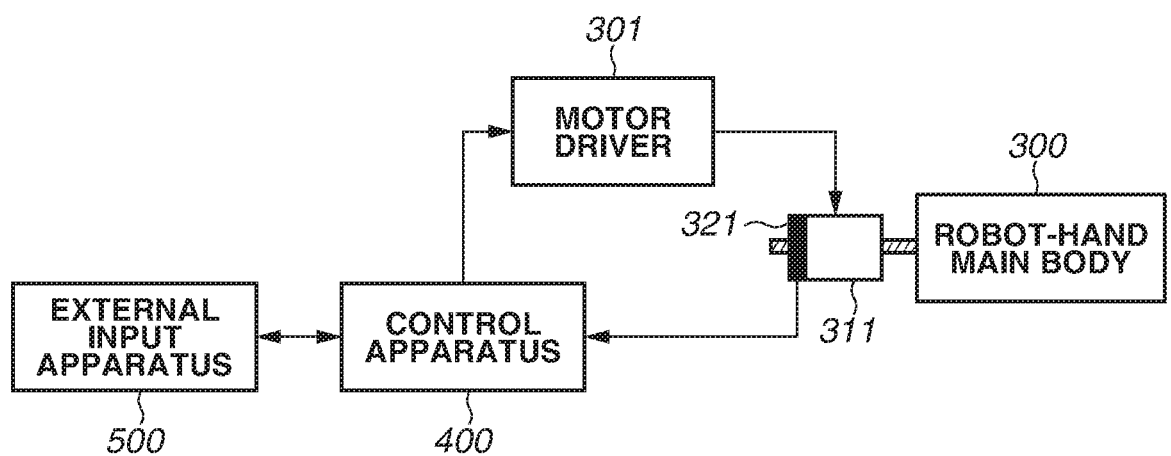
FIG. 2 is a control block diagram illustrating a robot-hand main body according to an exemplary embodiment.

FIG. 2 is a block diagram that is a simplified control block diagram of the robot-hand main body 300.

In FIG. 2, the control apparatus 400 transmits the operation data and the synchronization signal to the hand motor driver 301 based on a command value input by a user using the external input apparatus 500.

The hand motor driver 301 receives the operation data and the synchronization signal from the control apparatus 400 and rotates the motor 311 in a target direction at a required angle and at a required speed.

Since the control apparatus 400 is configured to recognize the rotation angle of the motor 311, a motor encoder 321 is provided. The motor encoder 321 transmits information about the rotation angle of the motor 311 to the control apparatus 400.

In this process, the information from the motor encoder 321 is transmitted to the control apparatus 400 via the wireless communication path 12 using the antenna 13.

Methods of the motor encoder 321 include a magnetic encoder and an optical encoder. Further, rotation detection methods include an absolute method and an increment method.

The increment method detects the angle of a motor in a single rotation, whereas the absolute method can count the number of rotations of a motor rotated more than once.

In many cases, a motor used in a robot apparatus is rotated more than once, so that the absolute method is often used.

In the present exemplary embodiment, the control apparatus 400 is provided outside the robot apparatus 100, and the hand motor driver 301 is built in the robot-hand main body 300.

With the above-described configuration, the position of the finger portion of the robot-hand main body 300 is detected by the motor encoder 321 and feedback is transmitted to the control apparatus 400, whereby the position of the finger portion of the robot-hand main body 300 is controlled.

How the hand motor driver 301 controls the robot-hand main body 300 based on the operation data and the synchronization signal transmitted from the control apparatus 400 will be described in detail below with reference to FIGS. 3A and 3B.

FIGS. 3A and 3B are schematic views illustrating a burst synchronization signal 14 superimposed on the power supply cable 1 and transmitted from the control apparatus 400 and wireless signal 20 transmitted from the control apparatus 400 via the wireless communication path 12. FIG. 3A is a schematic view illustrating the synchronization signal 14 transmitted via the power supply cable 1, and FIG. 3B is a schematic view illustrating the wireless signal 20 transmitted via the wireless communication path 12.

In FIG. 3A, the synchronization signal superimposed on the power supply cable 1 is superimposed and transmitted as the burst synchronization signal 14.

Figure 4:
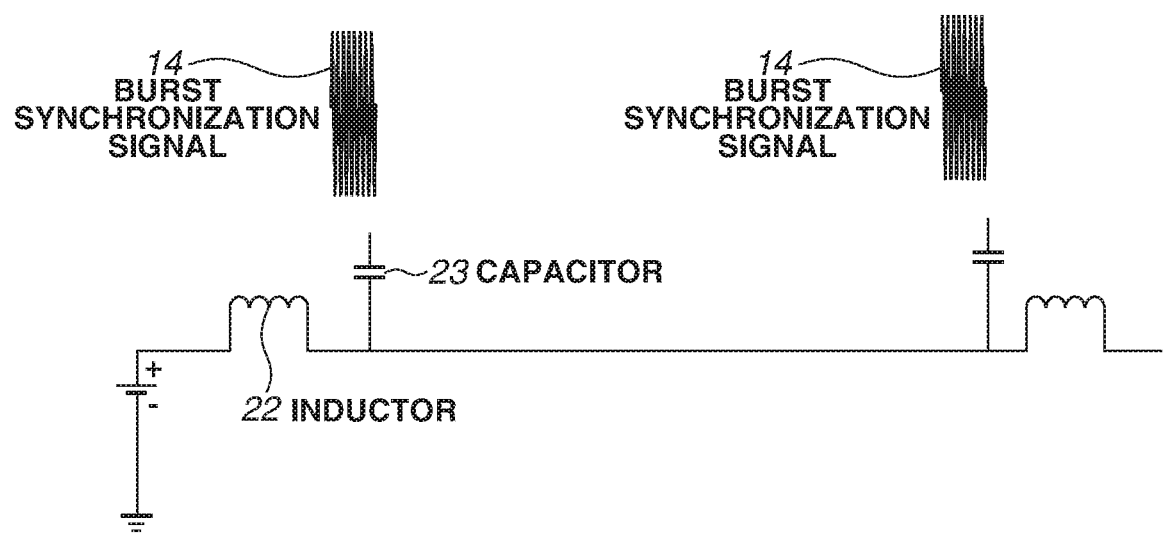
FIG. 4 is a schematic view illustrating a circuit that generates a burst synchronization signal according to an exemplary embodiment.

The burst synchronization signal 14 is transmitted by, for example, a circuit including a combination of an inductor 22 and a capacitor 23 as illustrated in FIG. 4.

For example, the capacitor 23 couples a sine waveform of 100 kHz during the period of the burst synchronization signal 14.

At the reception end, this signal is acquired by capacitor coupling and filtered, and then the resulting signal is used as the burst synchronization signal 14.

While the burst synchronization signal 14 is transmitted by the above-described method in the present exemplary embodiment, the burst synchronization signal 14 can be transmitted by another circuit.

In FIG. 3B, a wireless signal 20 transmitted via the wireless communication path 12 contains m pieces of data strings, which are operation data 1, operation data 2, . . . , and operation data m, where m denotes the number of pieces of operation data.

Further, the wireless signal 20 contains an execution operation data instruction signal 15, which specifies the operation data to be executed among the plurality of pieces of operation data.

In a case where the number of pieces of operation data is m, the data string of the first wireless signal 20-1 shown on the left-hand side of FIG. 3B stores the operation data 1 to m and is transmitted.

The data string of the second wireless signal 20-2 shown on the right-hand side of FIG. 3B conveys the operation data 2 to m+1.

The operation data 1 and the operation data 2 are data such as a command value that relates to an operation of the robot-hand main body 300 in real time, and a single piece of operation data per operation of one second is transmitted from the wireless signal 20.

Specifically, the operation data m is the operation data to which the robot-hand main body 300 responds at a timing that is about m−1 seconds after the timing at which the operation data 1 is transmitted.

Thus, the number-of-pieces-of-operation-data m indicates the number of pieces of operation data for the operation of the robot-hand main body 300 up to a predetermined time.

As the number-of-pieces-of-operation-data m increases, the number of pieces of operation data contained in one wireless signal 20 increases. Accordingly, the predetermined time increases.

The execution operation data instruction signal 15 is also differentiated as the first execution operation data instruction signal, the second execution operation data instruction signal, and so on. An execution operation data instruction signal 15-1 of the wireless signal 20-1 shown on the left-hand side of FIG. 3B is the first execution operation data instruction signal, and an execution operation data instruction signal 15-2 of the wireless signal 20-2 shown on the right-hand side of FIG. 3B is the second execution operation data instruction signal.

If the first execution operation data instruction signal 15-1 is received, the first operation data is executed, and if the second execution operation data instruction signal 15-2 is received, the second operation data is executed.

Similarly, in FIG. 3A, the burst synchronization signal 14 is also differentiated as the first burst synchronization signal, the second burst synchronization signal. A burst synchronization signal 14-1 shown on the left-hand side of FIG. 3A is the first burst synchronization signal, and a burst synchronization signal 14-2 shown on the right-hand side of FIG. 3A is the second burst synchronization signal.

Specifically, if the first burst synchronization signal 14-1 is received, the first operation data is executed, and if the second burst synchronization signal 14-2 is received, the second operation data is executed.

With the above-described method, the execution operation data instruction signal 15 or the burst synchronization signal 14 can be used as a reference for an operation data execution timing.

The burst synchronization signal 14 and the execution operation data instruction signal 15 are transmitted in a temporally associated manner, and the first execution operation data instruction signal 15-1 is transmitted at the same time point as the first burst synchronization signal 14-1.

In a case where there is a margin for an operation data execution timing, the transmission timings of the execution operation data instruction signal 15 and the burst synchronization signal 14 can have a range. For example, the execution operation data instruction signal 15-1 can be transmitted first and thereafter the burst synchronization signal 14-1 can be transmitted.

A method of transmitting the wireless signal 20 and the burst synchronization signal 14 will be described in detail below with reference to a block diagram.

Figure 5:
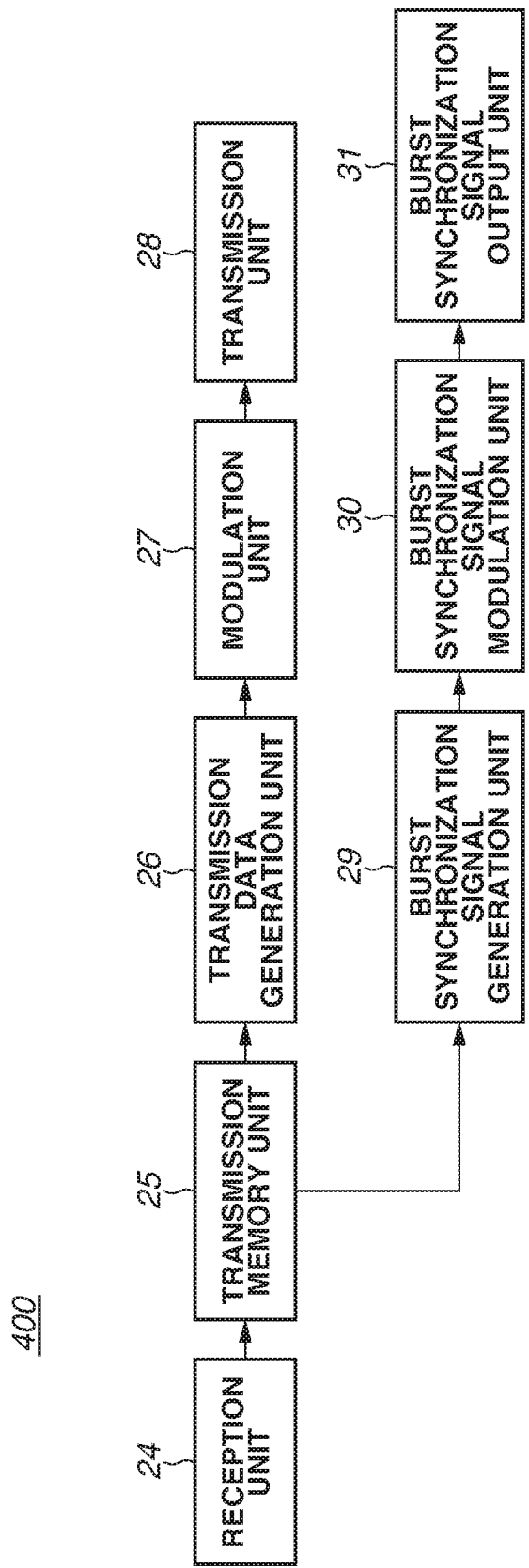
FIG. 5 is a block diagram illustrating a control apparatus according to an exemplary embodiment.

FIG. 5 is a block diagram illustrating blocks of processing units included in the control apparatus 400, which is an apparatus that transmits the wireless signal 20.

In FIG. 5, a reception unit 24 receives the operation data for controlling the robot-hand main body 300 from the external input apparatus 500.

The received operation data is first stored in a transmission memory unit 25 up to when the m pieces of operation data illustrated in FIG. 3B are accumulated.

If the m pieces of operation data are accumulated, a transmission data generation unit 26 combines the m pieces of operation data as the wireless signal 20, and then a modulation unit 27 modulates the wireless signal 20 and the modulated wireless signal 20 is transmitted.

The execution operation data instruction signals 15 each corresponding to a different one of the wireless signals 20 are combined by the transmission data generation unit 26, and after the combined execution operation data instruction signal 15 is modulated by the modulation unit 27, the modulated execution operation data instruction signal 15 is transmitted to a transmission unit 28, and the execution operation data instruction signal 15 is transmitted to the hand motor driver 301 by the antenna 13.

If it is confirmed that a sufficient number of pieces of operation data for generating one wireless signal 20 are stored in the transmission memory unit 25, a burst synchronization signal generation unit 29 generates the burst synchronization signal 14 to be superimposed on the power supply cable 1. A generation method is as described above with reference to FIG. 4.

Then, as in the case of the wireless signal 20, a burst synchronization signal modulation unit 30 modulates the burst synchronization signal 14 and then outputs the modulated burst synchronization signal 14 to a burst synchronization signal output unit 31.

Then, the burst synchronization signal 14 is transmitted to the hand motor driver 301 via the power supply cable 1, in temporally associated manner with the execution operation data instruction signal 15 of the wireless signal 20.

Figure 6:
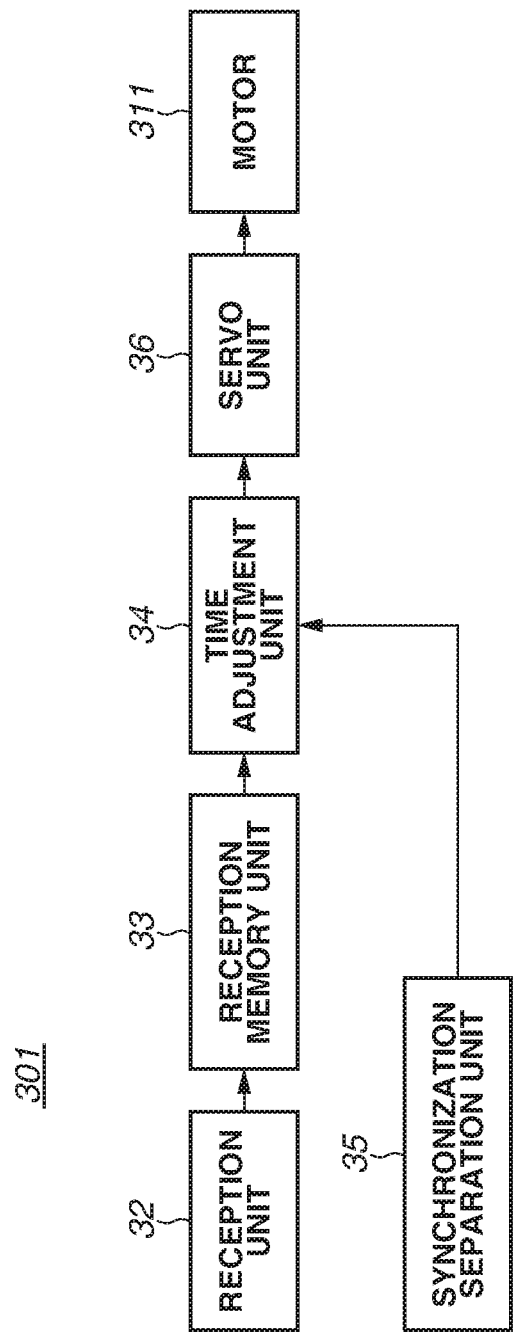
FIG. 6 is a block diagram illustrating a hand motor driver according to an exemplary embodiment.

Next, processing units included in the hand motor driver 301, which is an apparatus that receives the wireless signal 20, will be described below with reference to a block diagram. FIG. 6 is a block diagram illustrating blocks of the processing units included in the hand motor driver 301.

In FIG. 6, the wireless signal 20 received by a reception unit 32 is first stored in a reception memory unit 33.

Meanwhile, the burst synchronization signal 14 superimposed on the power supply cable 1 is received by a synchronization separation unit 35, and the burst synchronization signal 14 is separated from a power supply signal.

Then, the wireless signal 20 and the burst synchronization signal 14 are input to a time adjustment unit 34, and timings of the execution operation data instruction signal 15 and the burst synchronization signal 14 are synchronized.

Then, the wireless signal 20 and the burst synchronization signal 14 are input to a servo unit 36 with the timings of the execution operation data instruction signal 15 and the burst synchronization signal 14 synchronized as illustrated in FIGS. 3A and 3B.

Then, the servo unit 36 controls the motor 311 using the operation data to be executed based on the execution operation data instruction signal 15 and the burst synchronization signal 14.

Figure 7:
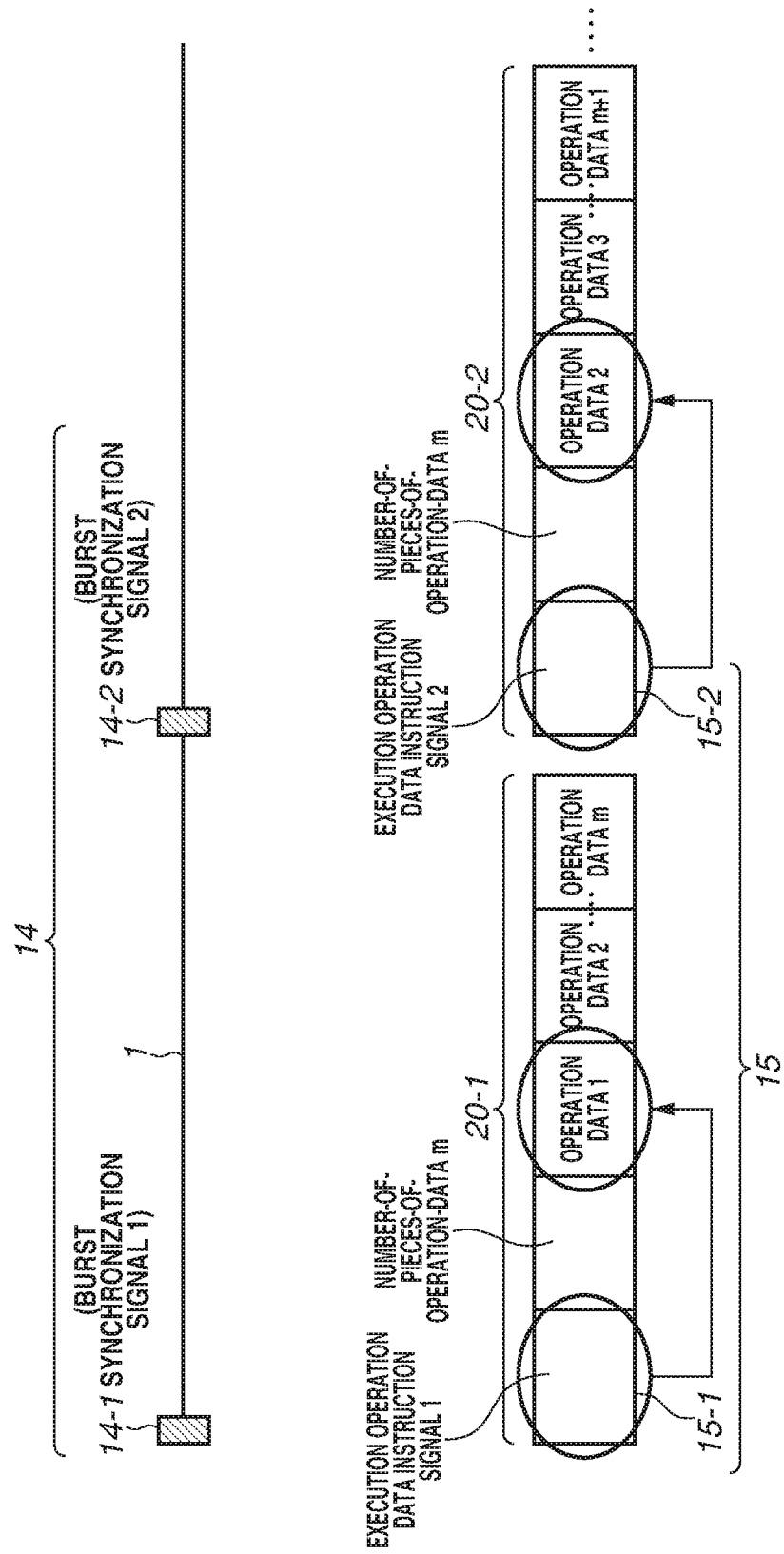
FIG. 7 is a schematic view illustrating a synchronization signal that is superimposed on a power supply cable and transmitted and operation data that is transmitted by a wireless signal according to an exemplary embodiment in a case where wireless communication is maintained.

FIG. 7 is a schematic view illustrating signals that are transmitted while the wireless communication via the antenna 13 is maintained.

If the first wireless signal 20-1 shown on the left-hand side of FIG. 7 is transmitted, the hand motor driver 301 controls the motor 311 using the corresponding operation data 1 based on the first execution operation data instruction signal 15-1.

If the second operation data 20-2 shown on the right-hand side of FIG. 7 is transmitted, the hand motor driver 301 controls the motor 311 using the corresponding operation data 2 based on the second execution operation data instruction signal 15-2.

More specifically, in a case where the wireless communication is maintained, the operation data 2 to the operation data m contained in the wireless signal 20-1 are not used.

In a case where the second wireless signal 20-2 is received while the first operation data is executed, the second operation data is executed as soon as the first operation data is ended.

With the above-described technique, the robot-hand main body 300 can be controlled continuously via wireless communication.

Figure 8:
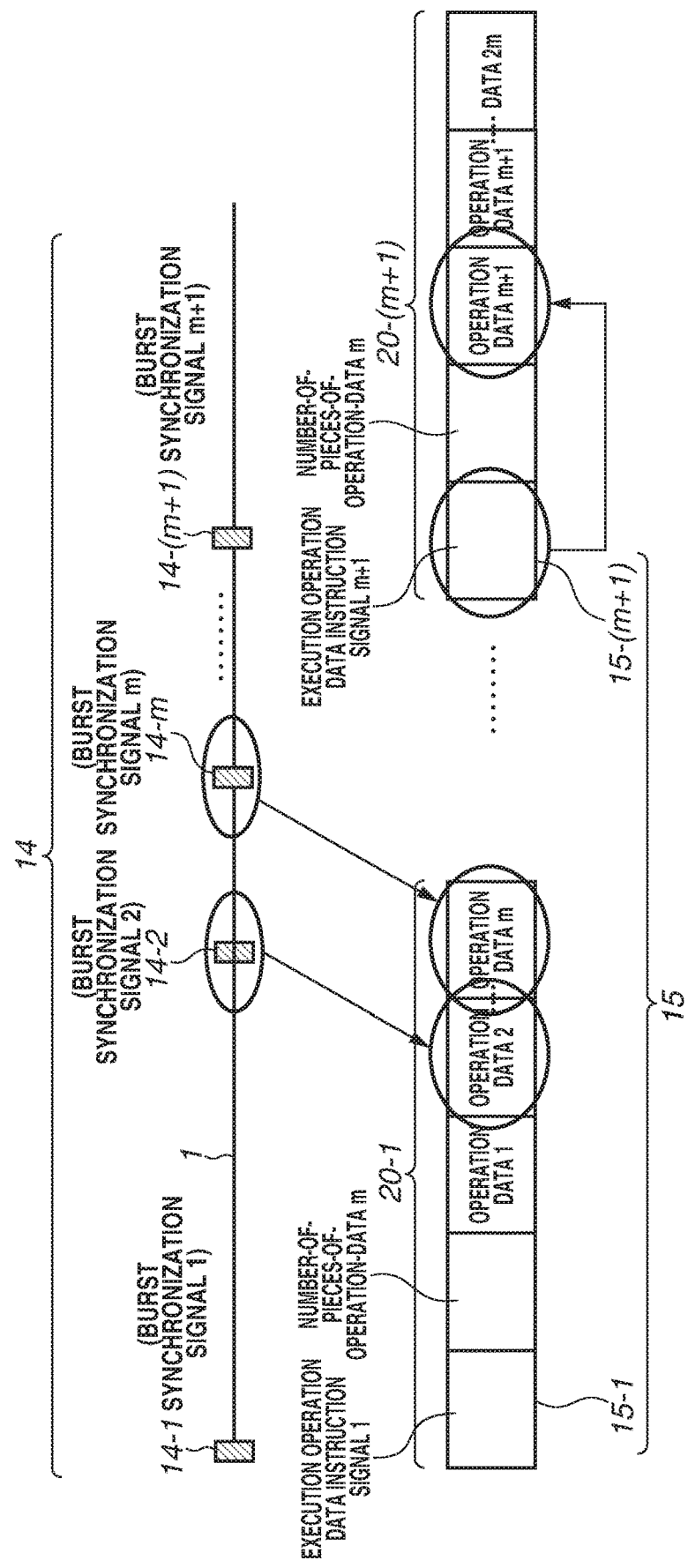
FIG. 8 is a schematic view illustrating a synchronization signal that is superimposed on a power supply cable and transmitted and operation data that is transmitted by a wireless signal according to an exemplary embodiment in a case where wireless communication is disconnected.

Next, a case where the wireless communication is disconnected due to an operation performed by the robot-arm main body 200 immediately after the first wireless signal 20-1 is transmitted and the second wireless signal 20-2 is not transmitted will be discussed below. FIG. 8 is a schematic view illustrating signals in a case where the wireless communication via the antenna 13 is disconnected.

In FIG. 8, in a case where the second execution operation data instruction signal 15-2 is not confirmed due to the disconnection of the wireless communication, the hand motor driver 301 changes a signal that is to be a control reference signal from the execution operation data instruction signal 15 to the burst synchronization signal 14 superimposed on the power supply cable 1.

Then, the hand motor driver 301 selects the operation data 2 corresponding to the second burst synchronization signal 14-2 from the first wireless signal 20-1 shown on the left-hand side of FIG. 8, which is stored in the reception memory unit 33, based on the burst synchronization signal 14 and causes the motor 311 to operate.

The wireless signal 20-1 transmitted immediately before the wireless communication is disconnected contains the operation data m, which is the subsequent operation data of up to about m−1 seconds, and is stored in a memory, so that the operation can be continued for up to about m−1 seconds with the burst synchronization signal 14.

During about the m−1 seconds, if the wireless communication is restored and the (m+1)th wireless signal 20-(m+1) shown on the left-hand side of FIG. 8 is transmitted, the control reference signal is changed to the execution operation data instruction signal 15-(m+), and the operation of the robot-hand main body 300 can be continued.

While the (m+1)th wireless signal 20-(m+1) is illustrated in FIG. 8, if the wireless communication is restored earlier and the wireless signal 20 that corresponds to forwarded operation data, such as the mth wireless signal 20-m or the (m−1)th wireless signal 20-(m−1), is transmitted, the control reference signal can sequentially be changed.

As described above, the operation data of the subsequent period of about m seconds is transmitted in advance in the present exemplary embodiment even in a case where the wireless communication is disconnected. Thus, the robot-hand main body 300 can be operated using the operation data transmitted in advance based on the synchronization signal that is superimposed on the power supply cable 1, whereby the robot-hand main body 300 is controlled while occurrences of an erroneous operation are reduced and real-time properties are maintained.

The number-of-pieces-of-operation-data m can be changed as needed based on the frequency of disconnections of wireless communication. In a case of a 5G wireless communication unit, since a large amount of data can be transmitted, the number-of-pieces-of-operation-data m can be increased, so that the operation is ensured for a long period of time.

In a case where the operation data 20 is transmitted to the motor 311 using wire such as a communication cable, different control wiring and motor encoder wiring are used for each mounted motor.

A parallel or serial signal is used as a control signal that is transmitted using wire such as a communication cable, and in the case of the parallel signal, for example, about 10 bits (ten communication cables) are used.

In the both cases of the parallel signal and the serial signal, the communication cables are shielded from each other to reduce or prevent an influence of noise from an arm motor that operates the robot-arm main body 200.

In a case of using shield wiring, a wiring diameter is increased and the bending resistance deteriorates. As described above, in a case where wiring is extended in the robot-arm main body 200 to operate the robot-hand main body 300 at the distal end of the robot-arm main body 200, several to ten shielded wires are used.

In the present exemplary embodiment, however, since the operation data for the operation of the robot-hand main body 300 is wirelessly transmitted, several to ten shielded wires can be eliminated.

Thus, increase in the thickness of the links of the robot-arm main body 200 is reduced or prevented and, furthermore, the wires extended in the robot-arm main body 200 are reduced, so that the wiring durability is increased.

While the operation data in units of one second is described as an example in the present exemplary embodiment, the operation data is not limited to that described above. For example, in a case where the transmission capacity of wireless communication has a margin, a plurality of pieces of operation data corresponding to one process in the operation of the robot apparatus 100 is transmitted, and in a case where the wireless communication is disconnected, the timing to execute each process can be determined based on the burst synchronization signal 14.

Further, the operation data to be transmitted can be a programming language that defines the operation of the robot apparatus 100.

In the first exemplary embodiment, the execution operation data instruction signal 15 determines the operation data that is to be executed in the case where the wireless communication via the antenna 13 is maintained.

However, since the burst synchronization signal 14 is transmitted using wire via the power supply cable 1, the possibility that the burst synchronization signal 14 is disconnected is low.

In a second exemplary embodiment, the operation data that is to be executed can be determined based on the burst synchronization signal 14 regardless of whether the wireless communication via the antenna 13 is disconnected.

Points in which hardware and control system configurations are dissimilar to those in the first exemplary embodiment will be described below with reference to the drawings. Further, points that are similar to those in the first exemplary embodiment have similar configurations and actions to those described above, and detailed description thereof is omitted.

Figure 9:
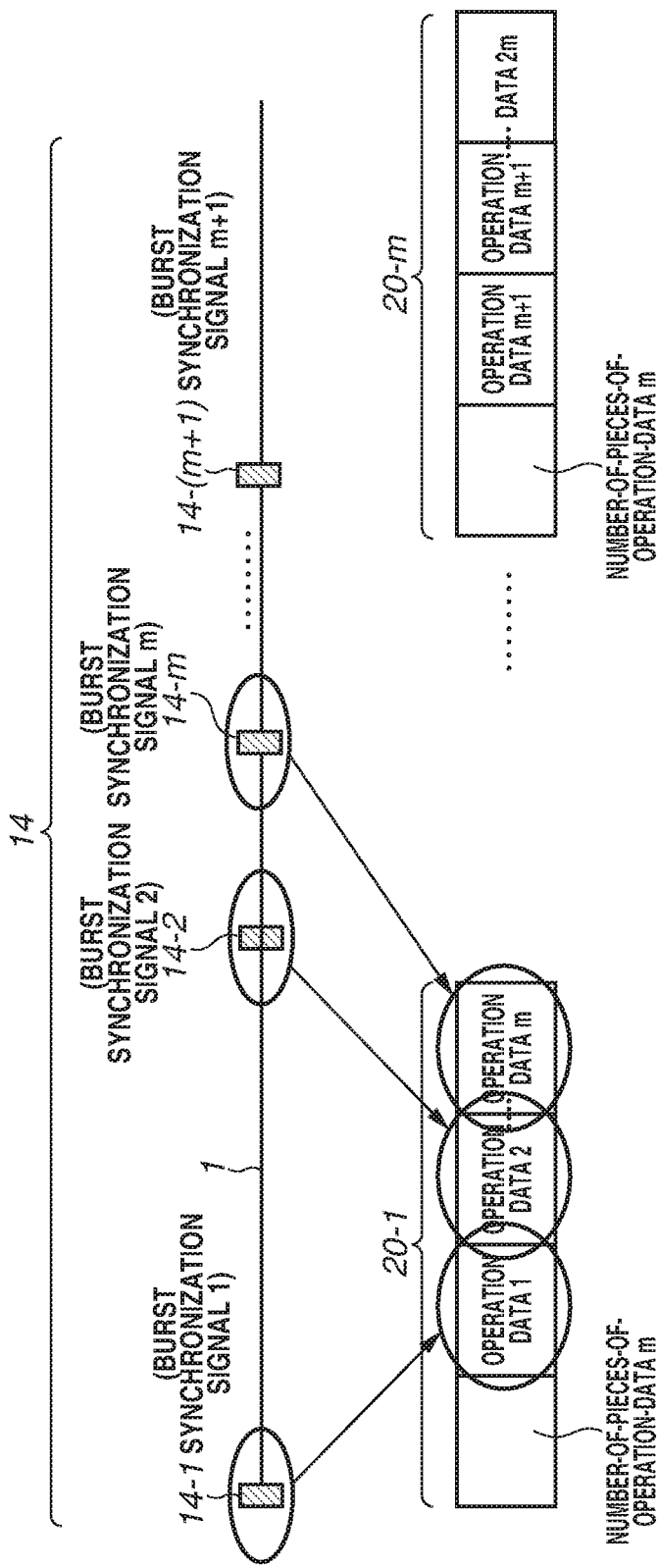
FIG. 9 is a schematic view illustrating a synchronization signal that is superimposed on a power supply cable and transmitted and operation data that is transmitted by a wireless signal according to an exemplary embodiment in a case where wireless communication is disconnected.

FIG. 9 is a schematic view illustrating the wireless signal 20 and the burst synchronization signal 14 that are transmitted in the second exemplary embodiment.

If the first wireless signal 20-1 shown on the left-hand side of FIG. 9 is transmitted, the hand motor driver 301 controls the motor 311 based on the first burst signal 14-1 using the corresponding operation data 1.

If the second burst signal 14-2 shown on the right-hand side of FIG. 9 is transmitted, the hand motor driver 301 controls the motor 311 based on the second burst signal 14-2 using the corresponding operation data 2.

In the above described way, the operation up to about m−1 seconds can be continued based on the first wireless signal 20-1, which contains the operation data m of up to about m−1 seconds, and the burst synchronization signal 14 regardless of whether the wireless communication is disconnected.

Then, if the (m+1)th wireless signal 20-(m+1) shown on the right-hand side of the FIG. 9 is transmitted, the control of the motor 311 can be continued as described above.

As described above, according to the second exemplary embodiment, the robot-hand main body 300 is operated based on the burst synchronization signal 14 superimposed on the power supply cable 1 using the operation data transmitted in advance, whereby the robot-hand main body 300 is controlled while occurrences of an erroneous operation are reduced or prevented and real-time properties are maintained.

Further, the execution operation data instruction signal 15 is eliminated in the present exemplary embodiment, compared to the first exemplary embodiment.

Further, since the execution operation data instruction signal 15 is eliminated, the burst synchronization signal 14 and the execution operation data instruction signal 15 do not have to temporally associated with each other, so that the control load on the hand motor driver 301 is reduced.

While the communication by the robot-hand main body 300 disposed as an end effector on the robot-arm main body 200 is described as an example in the first exemplary embodiment, the configuration is not limited to that described above.

For example, the present exemplary embodiment is also applicable to a case where the antenna 13 is disposed in each joint of the robot-arm main body 200 to wirelessly control the motor that drives the joints of the robot-arm main body 200.

Points in which hardware and control system configurations in a third exemplary embodiment are dissimilar to those in the first and second exemplary embodiments will be described below with reference to the drawings. Further, points that are similar to those in the first exemplary embodiment have similar configurations and actions to those described above, and detailed description thereof is omitted.

Figure 10:
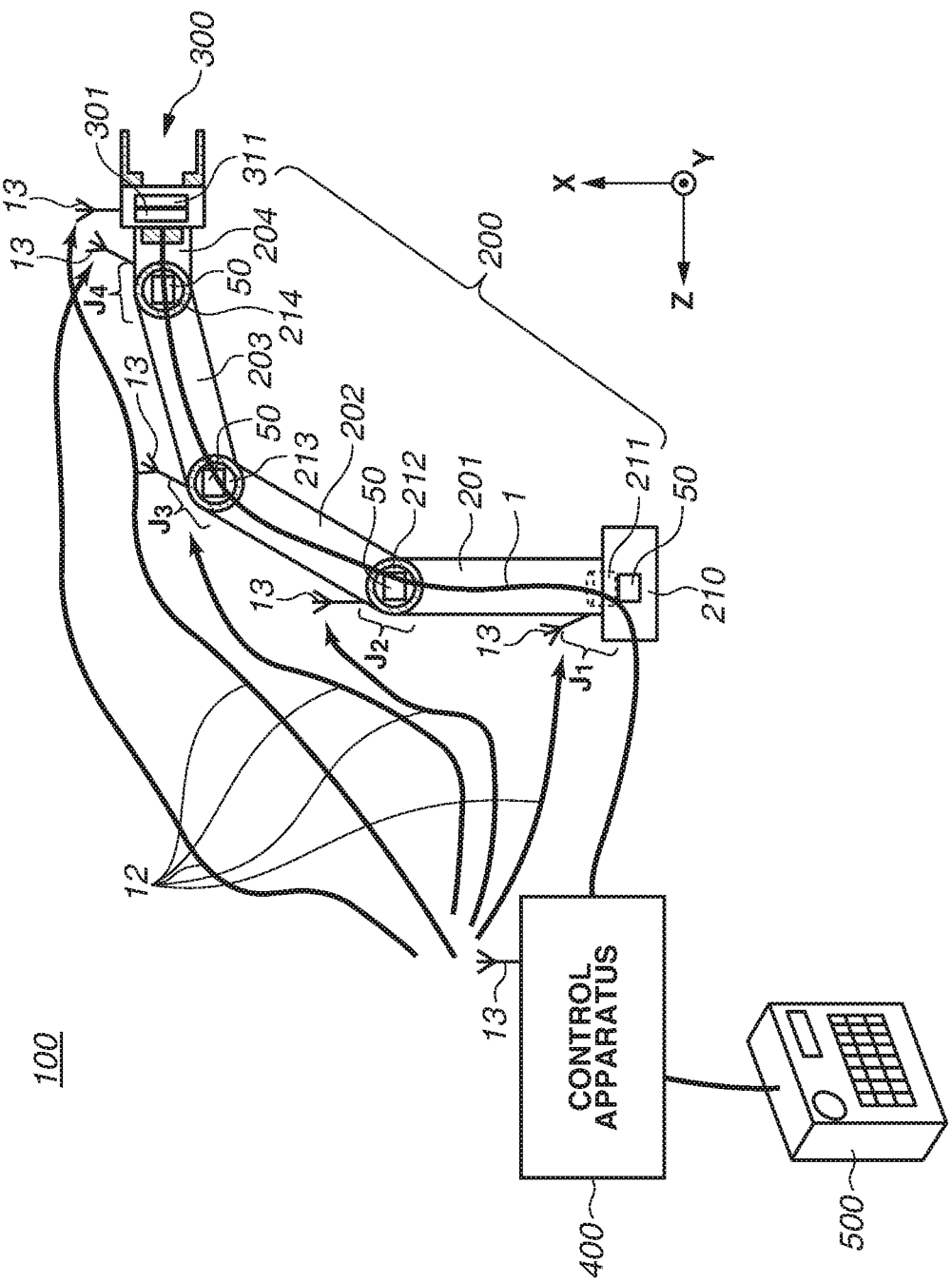
FIG. 10 is a schematic view illustrating a robot apparatus according to an exemplary embodiment.

FIG. 10 is a schematic view illustrating the robot apparatus 100 according to the present exemplary embodiment. A difference from the first exemplary embodiment is that the antenna 13 is disposed in each of joints $J_1$ to $J_4$ of the robot-arm main body 200.

An arm motor driver 50 for motor control is disposed in each of the motors 211 to 214 disposed in the joints $J_1$ to $J_4$, respectively.

The arm motor driver 50 includes the processing units illustrated in FIG. 6.

Further, the power supply cable 1 supplies power to the motors 211 to 214. The power supply cable 1 is branched to supply power to the motors 211 to 214.

Figure 11:
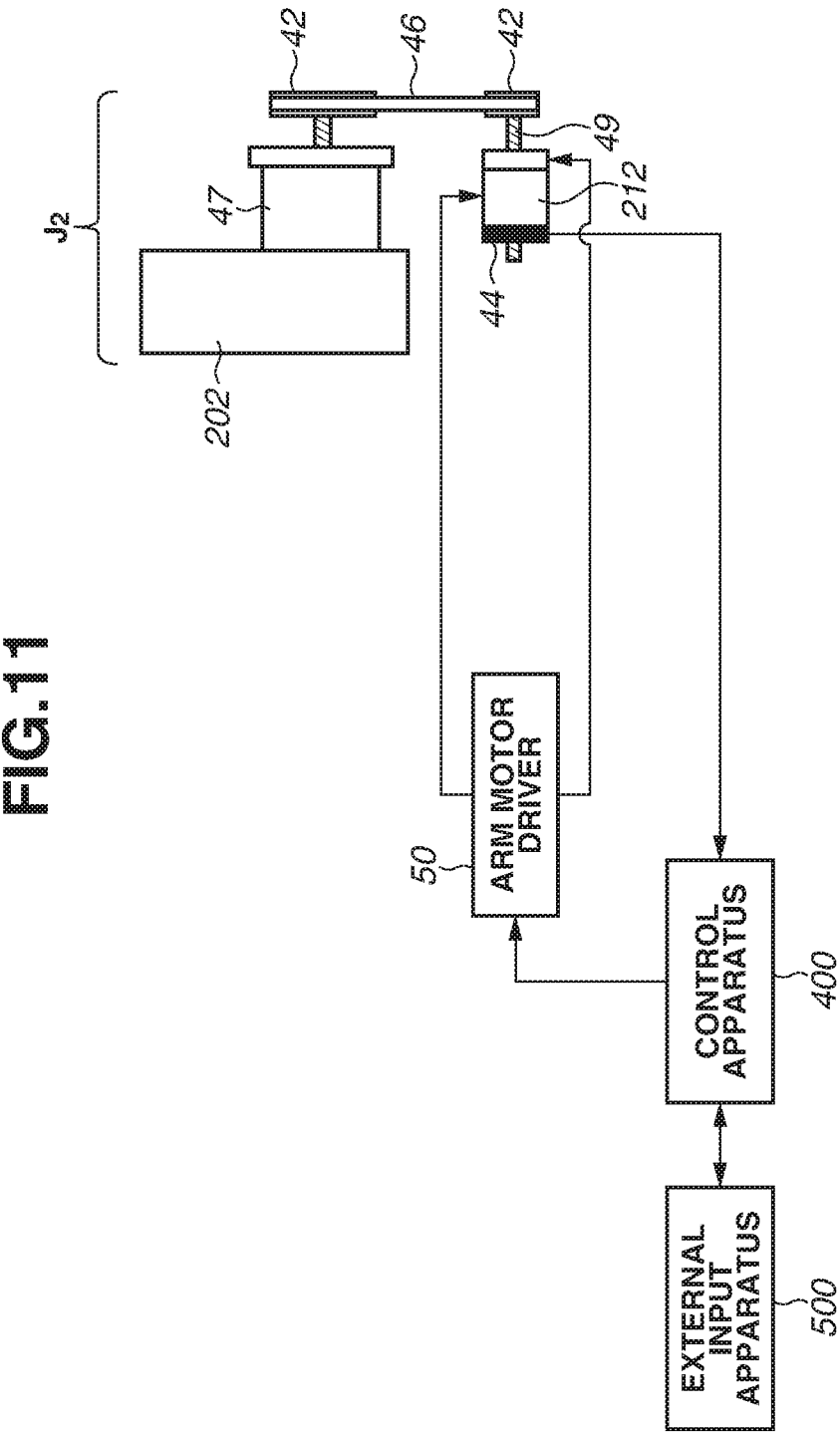
FIG. 11 is a control block diagram illustrating a robot-arm main body according to an exemplary embodiment.

FIG. 11 is a block diagram that is a simplified control block diagram of the joint $J_2$ of the robot-arm main body 200 according to the present exemplary embodiment.

In FIG. 1, the control apparatus 400 transmits operation data and a synchronization signal to the arm motor driver 50 based on a command value input by a user using the external input apparatus 500.

The arm motor driver 50 receives a control signal from the control apparatus 400 and rotates a motor 212 at an angle and a speed in a target direction.

A rotation shaft 49 of the motor 212 is coupled with a reduction gear 47 via a pulley 42 and a belt 46.

The rotation of the rotation shaft 49 of the motor 212 is input to the reduction gear 47, and the speed of rotations is reduced by the reduction gear 47, and the rotation with increased torque is transmitted to the link 202 to drive the link 202.

Since the control apparatus 400 needs to identify the rotation angle of the motor 212, a motor encoder 44 is provided in the motor 212, and the motor encoder 44 transmits the rotation angle of the motor 212 to the control apparatus 400.

The types of the motor encoder 44 include a magnetic encoder and an optical encoder. The functions of an encoder include an absolute encoder function and an increment encoder function.

An increment encoder detects the angle of a motor in a single rotation, whereas an absolute encoder can even count the number of rotations of a motor that is rotated a plurality of times.

In a case where the motor encoder 44 is disposed in a joint of the robot arm, an absolute encoder is used since the motor 212 is rotated a plurality of times.

Angle information about the motor 212 that is detected by the motor encoder 44 is transmitted to the control apparatus 400 via the wireless communication using the antenna 13.

In the present exemplary embodiment, a node control method in which the arm motor driver 50 is disposed to each joint is employed.

In the node control method, power is supplied and a control signal is transmitted to the arm motor driver 50 disposed in each joint and the arm motor driver 50 is operated, so that pulse width modulation (PWM) noise is less likely to be generated and an effect of noise is small.

When the control apparatus 400 transmits operation data to the arm motor driver 50 via the wireless communication using the power supply cable 1, a method that is similar to that described above in the first exemplary embodiment with reference to FIG. 8 or that described above in the second exemplary embodiment with reference to FIG. 9 is used to transmit the operation data.

In the above described way, even in a case where the motor 212 at each joint portion of the robot-arm main body 200 is controlled via wireless communication, the control is performed while occurrences of an erroneous operation are prevented or reduced and real-time properties are maintained.

According to the present exemplary embodiment, the communication cables for the wiring to each joint of the robot-arm main body 200 can be eliminated, so that increase in the thickness of the links of the robot-arm main body 200 is reduced or prevented and the wiring durability is increased.

The description above specifies that the processing procedures according to the first and second exemplary embodiments are executed by the control apparatus 400. Alternatively, a control program of software capable of executing the above-described functions and a recording medium that records the program can be installed in the external input apparatus 50X) to implement the processing procedures.

Accordingly, a control program of software capable of executing the above-described functions, a recording medium that records the program, and a communication apparatus are encompassed within the scope of the invention.

Further, while a case where a computer-readable recording medium is a read-only memory (ROM) or random-access memory (RAM) and the control program is stored in the ROM or RAM is described in the exemplary embodiments, the present invention is not limited to the forms described above.

The control program for implementing the present invention can be stored in any recording medium that is computer-readable. For example, a hard-disk drive (HDD), an external storage apparatus, or a recording disk can be used as a recording medium for supplying the control program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the antenna 13 is disposed on the control apparatus 400 and the control apparatus 400 transmits a control signal via the wireless communication path 12 and performs control in the various exemplary embodiments described above, the antenna 13 can be disposed in an area other than the control apparatus 400 to transmit the control signal 12.

While the power supply cable 1 is described as the cable that transmits the burst synchronization signals in the various exemplary embodiments described above, the cable is not limited to that described above. Various cables, such as a local area network (LAN) cable or universal serial bus (USB) cable that connect an information terminal to a network can be used.

While wireless communication is performed using the antenna 13 in the various exemplary embodiments described above, the configuration is not limited to those described above. For example, an information terminal, such as a smartphone, or a personal computer (PC) that has a wireless communication function, such as a Wi-Fi wireless communication function, can be used as the control apparatus 400 to wirelessly communicate with the robot apparatus 100.

While the robot apparatus 100 using the articulated robot arm having the plurality of joints is described in the various exemplary embodiments described above, the number of joints is not limited to that described above. While the vertical multiaxial configuration is described as a form of the robot apparatus 100, a configuration that is equivalent to that described above can be implemented also with joints of a different form such as a parallel link type.

While the configuration examples of the robot apparatus 100 are described with reference to the drawings illustrating the examples according to the exemplary embodiments in the various exemplary embodiments described above, the configurations are not limited to those described above, and a person skilled in the art can change a design as needed. Each motor disposed in the robot apparatus 100 is not limited to the above-described configurations, and a driving source that drives each joint can be a device such as an artificial muscle.

While the robot apparatus 100 is described as an example in the various exemplary embodiments described above, implementation is not limited to that described above. For example, implementation to a production apparatus that includes a hand or tool attached to a portion that is moved by various movement mechanisms is also possible. Specifically, implementation to a production apparatus that includes a linear guide as a movement mechanism and implementation to a production apparatus that includes a belt-conveyor as a movement apparatus are possible.

Further, the various exemplary embodiments described above are applicable to a machine that can automatically perform an operation such as expansion/contraction, bending/stretching, upward/downward movement, leftward/rightward movement, or turn operation or a combination thereof based on information in a storage apparatus provided to a control apparatus.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-238830, filed Dec. 20, 2018, and No. 2019-196805, filed Oct. 29, 2019, which are hereby incorporated by reference herein in their entirety.

What is claimed is:

1. A communication apparatus comprising:
    a transmission apparatus configured to transmit operation data for an apparatus;
    a reception apparatus configured to receive the operation data;
    a wireless communication unit via which the transmission apparatus and the reception apparatus wirelessly communicate with each other; and
    a cable configured to connect the transmission apparatus and the reception apparatus,
    wherein the transmission apparatus transmits a synchronization signal to the reception apparatus via the cable, the synchronization signal indicating a timing to execute the operation data, and
    wherein the transmission apparatus transmits the operation data corresponding to an operation of the apparatus in a predetermined period to the reception apparatus using the wireless communication unit, and
    wherein, in a case where the communication via the wireless communication unit is disconnected, the reception apparatus performs predetermined operation based on predetermined operation data from among the received operation data, based on the synchronization signal.

2. The communication apparatus according to claim 1, wherein the transmission apparatus transmits the operation data and designation information that designates operation data to be executed from among the operation data.

3. The communication apparatus according to claim 2,
    wherein in a case where the wireless communication via the wireless communication unit is maintained, the reception apparatus executes the operation data based on the designation information, and
    wherein, in a case where the communication via the wireless communication unit is disconnected, the reception apparatus performs predetermined operation based on predetermined operation data from among the received operation data, based on the synchronization signal.

4. The communication apparatus according to claim 1, wherein the cable is a cable that supplies power to the apparatus.

5. The communication apparatus according to claim 4, wherein the reception apparatus includes a synchronization separation unit configured to separate the synchronization signal from power supplied by the cable.

6. The communication apparatus according to claim 1, wherein the operation data corresponding to an operation of the apparatus in the predetermined period is operation data corresponding to an operation of the apparatus during a predetermined time.

7. The communication apparatus according to claim 1, wherein the operation data corresponding to an operation of the apparatus in the predetermined period is operation data corresponding to an operation of the apparatus during a predetermined process.

8. A production apparatus comprising:
the communication apparatus according to claim 1; and
an apparatus that includes a movement mechanism and a driving source that is moved by the movement mechanism.

9. A method of manufacturing an article using the production apparatus according to claim 8.

10. A robot apparatus comprising:
the communication apparatus according to claim 1; and
a robot arm that includes an end effector.

11. A method of manufacturing an article using the robot apparatus according to claim 10.

12. The robot apparatus according to claim 10, wherein the operation data for controlling the end effector is configured to be communicated by the communication apparatus.

13. The communication apparatus according to claim 1, wherein
after a predetermined number of pieces of the operation data is accumulated, the transmission apparatus combines the predetermined number of pieces of the operation data, modulates the combined operation data, and transmits the modulated combined operation data to the reception apparatus.

14. The communication apparatus according to claim 1, wherein
the transmission apparatus transmits the synchronization signal and the operation data not at an identical timing.

15. The communication apparatus according to claim 14, wherein
wherein the transmission apparatus transmits the operation data first, and transmits the synchronization signal after the transmission of the operation data.

16. The communication apparatus according to claim 1, wherein
the wireless communication unit uses at least one of Wi-Fi IEEE 802.1 communication, 4G communication, or 5G communication.

17. The communication apparatus according to claim 1, wherein
wherein the synchronization signal is transmitted by a circuit that includes an inductor and a capacitor.

18. The communication apparatus according to claim 1, wherein
the transmission apparatus transmits one piece of the operation data per operation of the apparatus for one second.

19. A robot apparatus comprising:
the communication apparatus according to claim 1; and
a robot arm that includes at least one driving source; and
the operation data for controlling the at least one driving source is configured to be communicated by the communication apparatus.

20. The robot apparatus according to claim 19, wherein a node control method including a driver corresponding to the at least one driving source is employed.

21. A communication method of a communication apparatus including:
a transmission apparatus configured to transmit operation data for an apparatus;
a reception apparatus configured to receive the operation data for the apparatus;
a wireless communication unit via which the transmission apparatus and the reception apparatus wirelessly communicate with each other; and
a cable configured to connect the transmission apparatus and the reception apparatus,
wherein the transmission apparatus transmits a synchronization signal to the reception apparatus via the cable, the synchronization signal indicating a timing to execute the operation data, and
wherein the transmission apparatus transmits the operation data corresponding to an operation of the apparatus in a predetermined period to the reception apparatus using the wireless communication unit, and
wherein, in a case where the communication via the wireless communication unit is disconnected, the reception apparatus performs predetermined operation based on predetermined operation data from among the received operation data, based on the synchronization signal.

22. A non-transitory computer-readable recording medium that stores a control program for executing the communication method according to claim 21.

23. A transmission apparatus that wirelessly transmits operation data for a predetermined apparatus to the predetermined apparatus, the predetermined apparatus including a cable and a control unit, the transmission apparatus comprising:
a processing unit;
wherein the processing unit transmits a synchronization signal to the control unit via the cable, the synchronization signal indicating a timing to execute the operation data, and
wherein the processing unit transmits the operation data corresponding to an operation of the predetermined apparatus for a predetermined period to the control unit via the wireless communication
wherein, in a case where the wireless communication is disconnected, the processing unit transmits, to the control unit, information for performing predetermined operation based on predetermined operation data from among the operation data received by the control unit, based on the synchronization signal.

* * * * *